March 1, 1955   I. FLORMAN   2,703,367
RADIATION DETECTOR MEANS ON VEHICLES AND LIKE CARRIERS
Filed June 2, 1950

INVENTOR.
IRVING FLORMAN
BY Leon M. Strauss
AGT.

United States Patent Office 2,703,367
Patented Mar. 1, 1955

2,703,367

RADIATION DETECTOR MEANS ON VEHICLES AND LIKE CARRIERS

Irving Florman, New York, N. Y.

Application June 2, 1950, Serial No. 165,832

1 Claim. (Cl. 250—83.6)

The present invention relates to radiation detector means for use on vehicles and similar movable carriers.

An object of this invention is to provide means signaling radiation influence and effects which exist in the area through which a vehicle is passing, either for the purpose of, for instance, warning the driver of any danger of radio-active and similar contaminated fields, of drawing a prospector's attention to any radio-active mineral deposits, etc.

Another object of the invention is to provide means for energizing radiation detector, as well as monitoring or alarm means controlled from the power supply of the vehicle on which such means are mounted.

According to a feature of the invention, the vehicle carries a suitable detector, such as a Geiger counter, and means for giving an alarm signal in response to an increase in the output of the detector above a predetermined limit; the alarm means may include an acoustic device adapted to produce clicking, buzzing or ringing sounds, and/or an optical device such as a continuous or a flickering light. Both types of devices may be provided for concurrent or selective use, preferably in combination with switch means for inactivating either the visual device (as, where its operation would be relatively ineffective owing to the presence of strong daylight) or the acoustic device (as, where it is undesirable to attract the attention of persons outside the vehicle).

It is another feature of the invention to provide means enabling the determination of the intensity of gamma rays and similar radiations (emanating from predetermined radium compounds) when exploring the surface or ground over which the vehicle moves, for evidence of uranium and like radioactive metal deposits an alarm device or devices being placed in any suitable location inside or outside the vehicle, such as the dashboard, radiator cap, etc.

Another object of the invention is to provide means making use of the horn of an automobile or the like as the acoustic or alarm device.

The invention is applicable to all types of motor vehicles, including automobiles, trucks, motorcycles, jeeps, buses, airplanes, tanks, boats, ducks, or any other land, water, air or amphibious conveyance.

With the above and other objects in view, the invention will be hereinafter more fully described and the combination and arrangement of parts will be shown in the accompanying drawings and pointed out in the claim which forms part of the specification.

Figure 1:
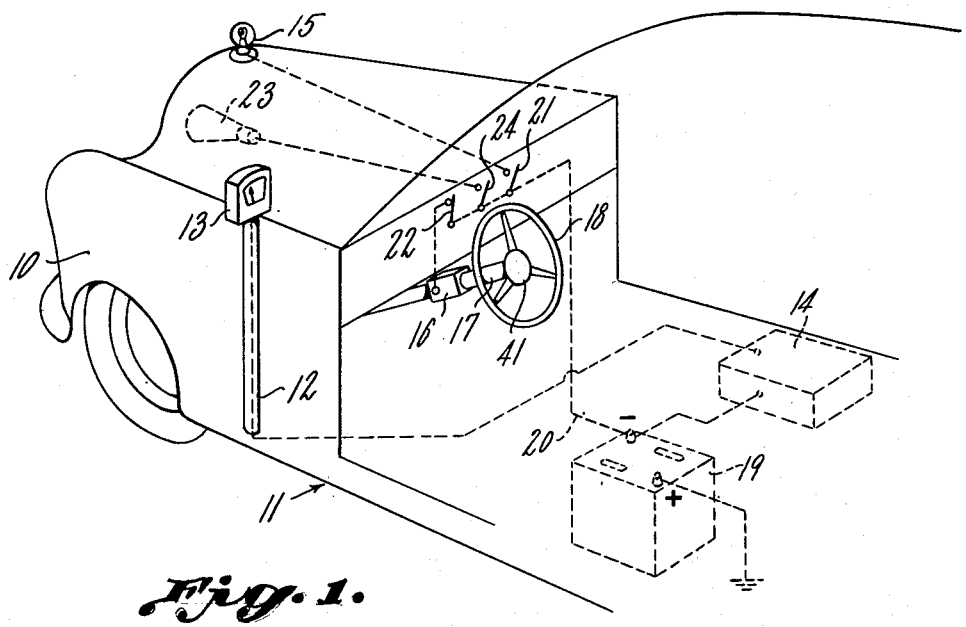
Figure 2:
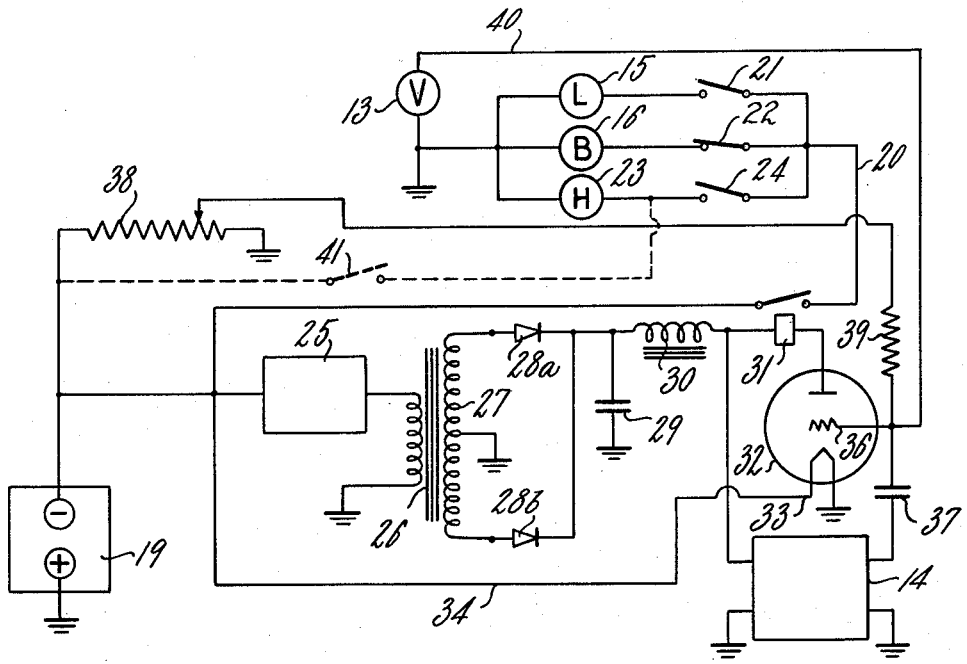

The invention will be described in detail with reference to the accompanying drawing in which:

Fig. 1 shows somewhat schematically a portion of an automobile in which the features of the invention are incorporated; and Fig. 2 shows a circuit diagram including the instruments shown in Fig. 1 and illustrating the mode of connection thereof.

As shown in Fig. 1, there is attached to the fender 10 of an automobile 11 a hollow vertical rod 12 forming the support for a voltmeter 13 calibrated to indicate the output of a Geiger counter 14, which is fastened to the floor of the automobile, or to some other suitable location thereof. The electrical connections between the voltmeter and the Geiger counter, as well as the interconnections between the other elements of the proposed arrangement, are made in a manner subsequently to be described in connection with Fig. 2.

For the present, the dotted lines of Fig. 1 will indicate in a general fashion the electrical relationship of the various components. Mounted at the location usually reserved for the radiator cap is a lamp 15, while a buzzer 16 is secured to the steering shaft 17 carrying the steering wheel 18. The power for all the foregoing units is supplied by the automobile storage battery 19, the positive terminal of which is, in conformance with standard procedure, shown grounded.

As indicated by the dotted line 20, power for the lamp 15 and the buzzer 16 is fed from the battery over switches 21, 22, respectively, mounted on the dashboard. The horn 23 is also connected to the battery over a switch 24 and is made available as a second acoustical alarm device. Buzzer switch 22 alone is shown in the closed position, thereby conditioning the buzzer 16 for actuation in a manner to be described.

In order to supply suitable plate voltage for the electronic triggering system to the embodiment illustrated in Fig. 1, as well as any high voltages which may be necessary for the operation of the Geiger counter, there is provided, as shown in Fig. 2, an interrupter 25 in series with the battery 19 and the primary of a step-up transformer 26. The secondary 27 of the transformer is center-tapped to ground, and a conventional full-wave rectifier circuit, comprising rectifiers 28a, 28b connected across the secondary 27, leads to a conventional filter circuit including a shunt condenser 29 and a series choke 30, the output of the choke passing through the windings of a relay 31 to the plate of a directly-heated triode 32.

Power for the filament 33 of the triode is supplied directly from the battery over a lead 34, the other side of the filament being grounded. The filtered output of the choke 30 is also used to supply power to the Geiger counter 14, one side of the input and output of the latter being grounded. The output of the Geiger counter is fed to the grid 36 of the triode through a condenser 37. The grid is biased beyond cutoff, the biasing voltage being tapped off a potentiometer 38 and leading through a series resistor 39 to the grid.

The series resistor 39 serves as part of an integrating circuit, together with the condenser 37, transforming a Geiger counter output, which ordinarily consists of intermittent pulses occurring with variable frequency, into an output of varying voltage applied to the grid 36.

Consequently, the plate current can be made to flow only when pulses occur at the Geiger counter output above a certain specified (or pre-set) frequency, corresponding to the presence of radiating field or influence.

When the triode bias has been reduced sufficiently by the output of the Geiger counter to permit the flow of plate current, the relay 31 will be operated, connecting the battery 19 to the switches 21, 22, 24 over the relay armature and lead 20. With the switches conditioned as shown, voltage will be supplied over the closed switch 22 and will actuate the buzzer 16. The lamp 15 and horn 23 may, of course, also be actuated by closing their associated switches 21, 24.

The voltmeter 13 is connected directly, via lead 40 passing through the rod 12, across the grid and cathode of the triode and consequently will always operate; the driver or other occupants of the car may then always observe the magnitude of the output of the Geiger counter. Switch 24 provided for operation of the horn 23 shunts the normal horn button, or switch, 41 (shown dotted in Fig. 2) which may be mounted on the steering wheel as shown in Fig. 1.

The indicating means hereinabove disclosed have been utilized to cover a number of applications. The buzzer 16 will indicate to the driver, and those close to him, the presence of any radiation. The voltmeter 13, easily seen from the interior of the car or any neighboring vicinity, will give an accurate and continuous estimate of the amount of radioactivity present in the surrounding area.

The lamp 15 will prove especially advantageous for survey purposes in places where destructive concentrations of radio-active contamination are present; it will indicate to a convoy of vehicles possibly not equipped with radiation detectors the presence of dangerous areas and is particularly adapted for night use. The horn 23 will serve to warn of the presence of predetermined radiation (gamma rays, for example) in the manner of the lamp, and may be used day or night. In addition, the horn represents a piece of equipment normally present on all vehicles and easily adapted for the present purpose. It will furthermore prove useful when a person has had occasion to leave the vehicle, warning all those within its range of the introduction of a source of dangerous radiations.

It is to be understood that suitable known gamma-ray counting meters of high sensitivity may be employed in connection with the invention.

While one embodiment of the invention has been shown and described, it will be easily understood that the same is capable of modification without departure from the general scope and spirit of the invention as defined in the claim.

Having thus described the invention, what is claimed as new and desired to be secured by Letters Patent, is:

In an automotive vehicle having a source of electric current; in combination, radiation detector means, normally inoperative alarm means associated with said radiation detector means, relay means for activating said alarm means to become operative when the output of said radiation detector means exceeds a predetermined level, indicator means measuring the instantaneous output of said radiation detector means, and circuit means supplying power from said source of current to said detector means, alarm means, relay means and indicator means, said indicator means being mounted on said vehicle and within the range of perception of the operator steering said vehicle.

References Cited in the file of this patent

UNITED STATES PATENTS

| | | |
|---|---|---|
| 2,037,924 | Rentschler | Apr. 21, 1936 |
| 2,237,193 | Mobsby | Apr. 1, 1941 |
| 2,401,723 | Deming | June 11, 1946 |
| 2,479,271 | Shonka | Aug. 16, 1949 |
| 2,496,886 | Molloy et al. | Feb. 7, 1950 |
| 2,499,489 | Goldstein et al. | Mar. 7, 1950 |

OTHER REFERENCES

Radium Detector, Circular "E" Geophysical Instrument Co., Washington, D. C., received by Patent Office Library on Feb. 15, 1940, 4 pages.